April 23, 1946.  V. T. SWANSON  2,398,975
MEANS FOR PRESTRESSING CABLE
Filed June 15, 1944   4 Sheets-Sheet 1
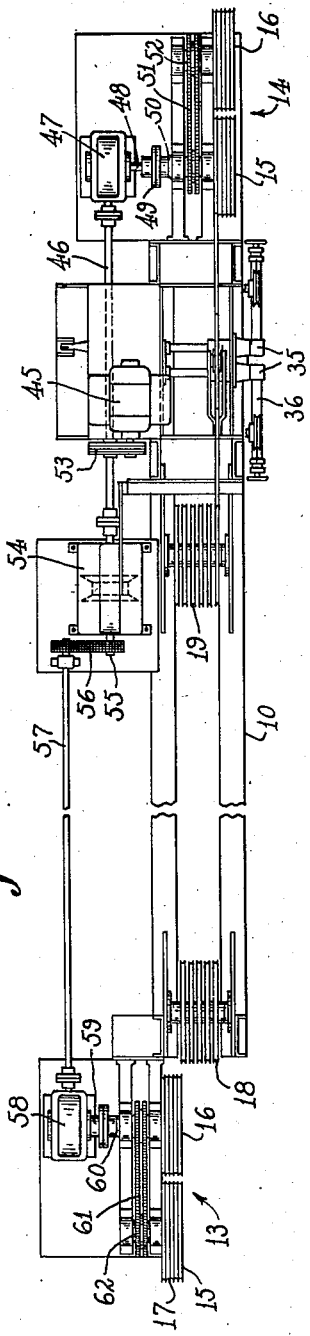
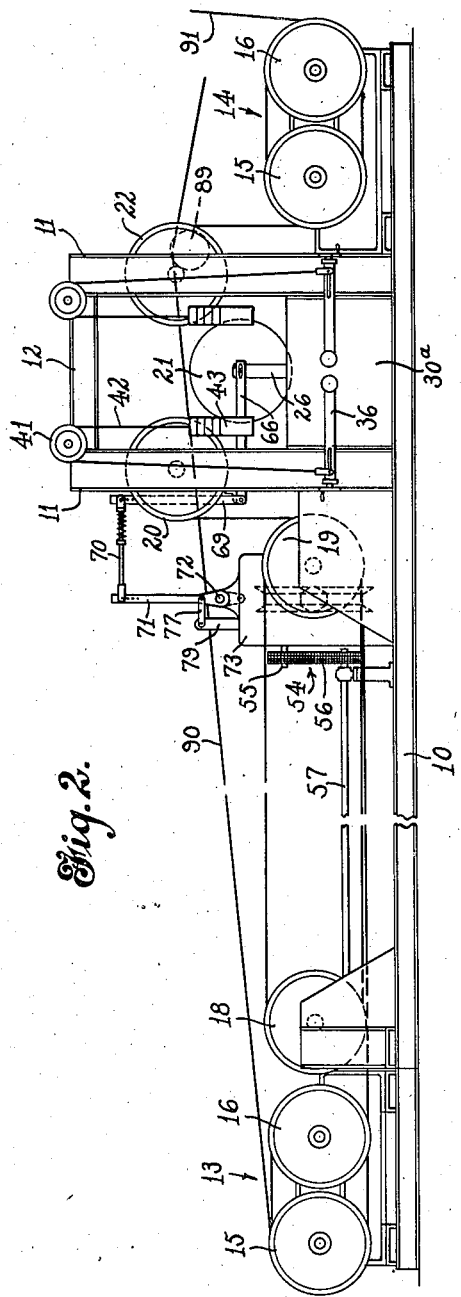
Inventor
Victor T. Swanson
By Rockwell & Bartholow
Attorneys

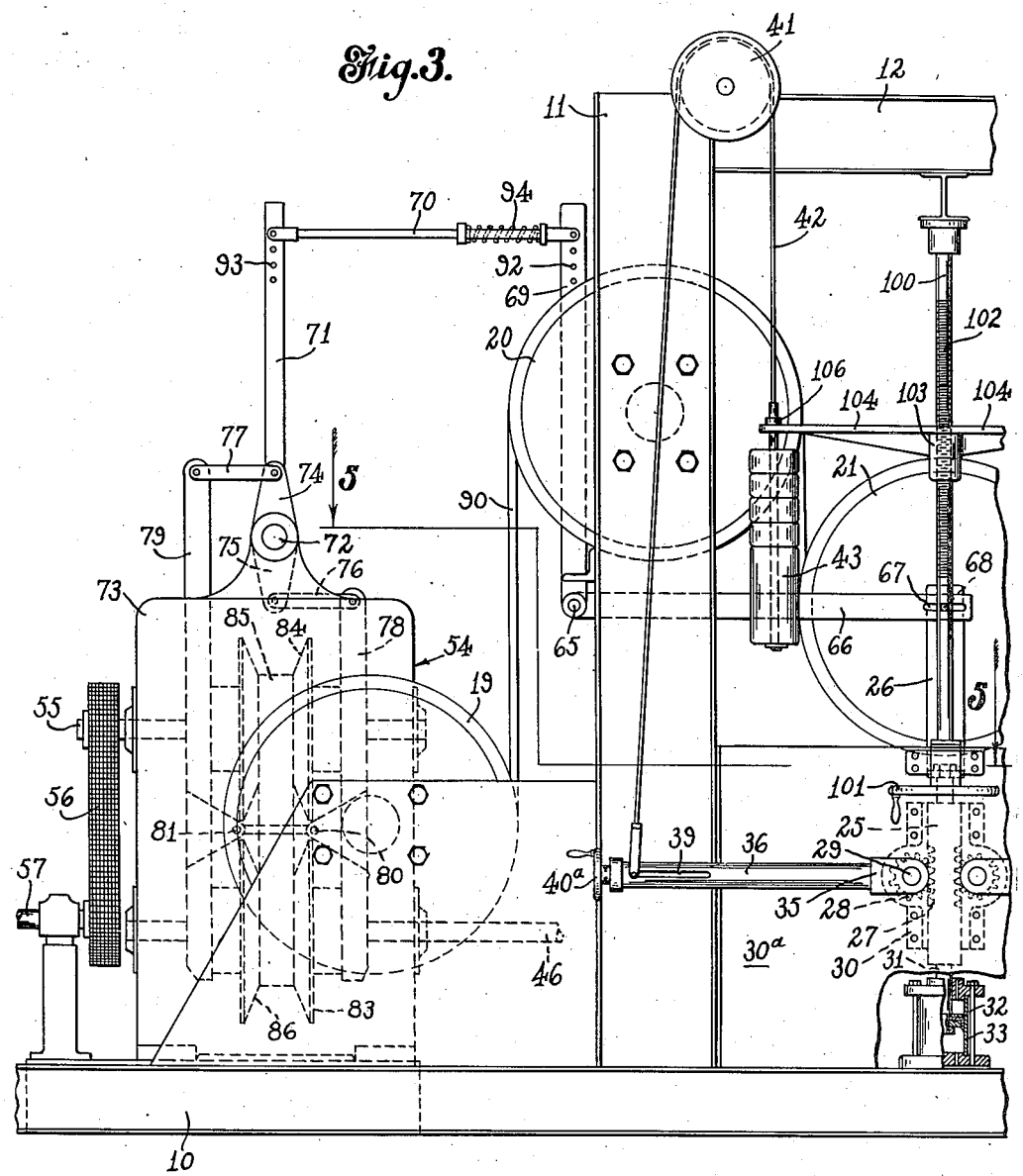

April 23, 1946. V. T. SWANSON 2,398,975
MEANS FOR PRESTRESSING CABLE
Filed June 15, 1944 4 Sheets-Sheet 3
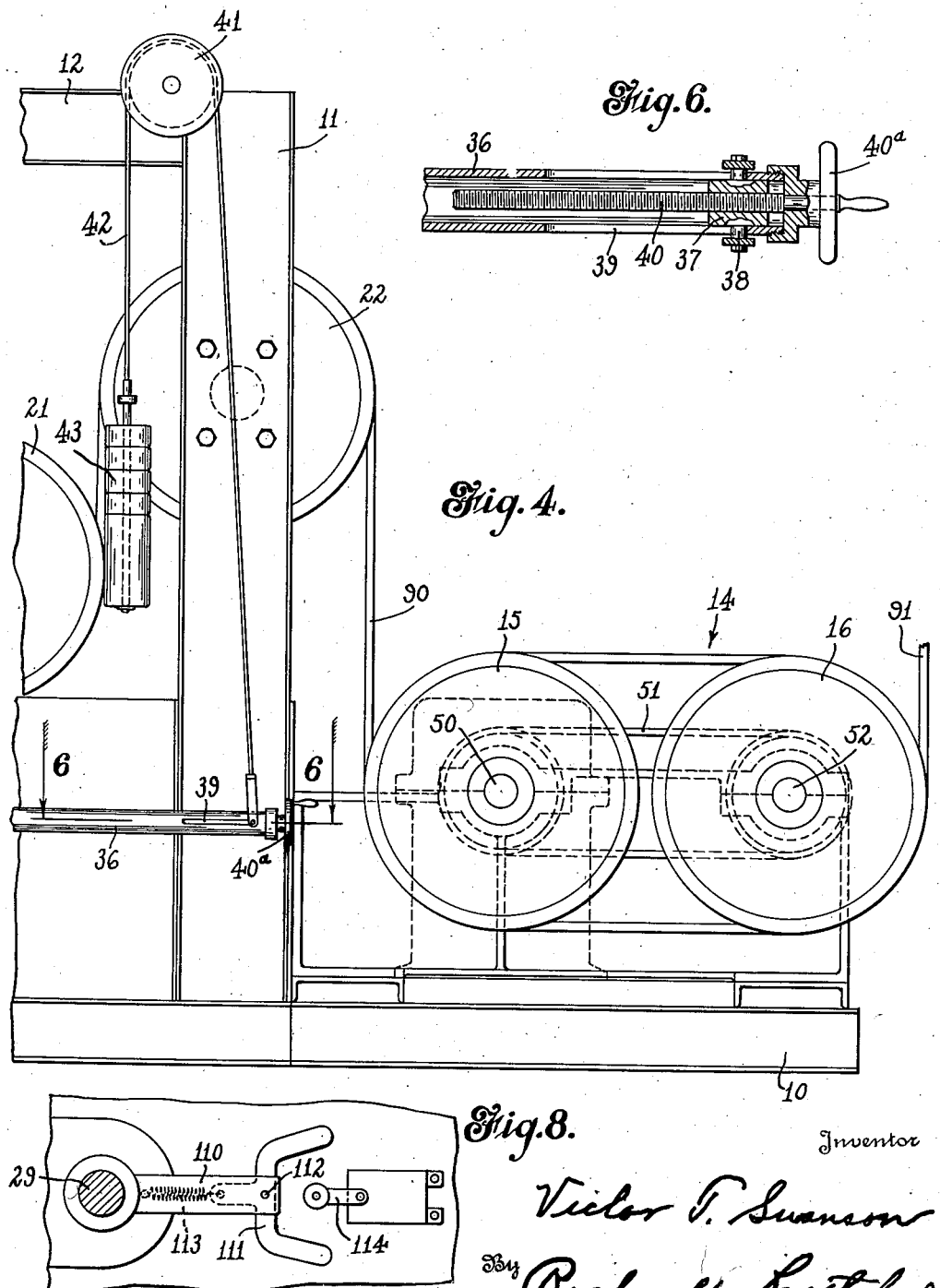

April 23, 1946.  V. T. SWANSON  2,398,975
MEANS FOR PRESTRESSING CABLE
Filed June 15, 1944  4 Sheets-Sheet 4

Inventor
Victor T. Swanson
By Rockwell & Bartholow
Attorneys

Patented Apr. 23, 1946

2,398,975

UNITED STATES PATENT OFFICE 2,398,975

MEANS FOR PRESTRESSING CABLE

Victor T. Swanson, New Haven, Conn., assignor to Wire Machinery Corporation of America, Incorporated, New Haven, Conn., a corporation of Connecticut Application June 15, 1944, Serial No. 540,409

4 Claims. (Cl. 28—71.3)

This invention relates to a method of and means for prestressing cable or rope, and more particularly to a machine which will subject every portion of a cable or rope to a given tensile stress while the cable or rope travels continuously from a paying off or supply reel to a take up reel.

In the manufacture of rope or cable, and particularly in the manufacture of wire rope, it is desirable to prestress the rope or cable, that is, subject every portion of it to a given tensile stress prior to its use. In the past, it has been necessary to prestress a cable in piecemeal fashion. That is to say, a given length of the cable would be placed under tension, held therefor for a required length of time, and then another length of the cable would be treated in a similar fashion. This was a somewhat tedious operation as it is not only desirable to place the cable under the required tensile force, but also to subject it to that force for a given length of time. Therefore, when a cable was prestressed in a piecemeal fashion as described above and only one portion of the cable could be placed under stress at one time, the operation was necessarily somewhat slow and tedious.

It is contemplated by the present invention to provide a mechanism by which the cable to be prestressed will be passed continuously from a supply reel to a take up reel or spool, and during such passage will be subjected to a prestressing force for the required interval of time. Moreover, by so arranging the mechanism that a considerable length of the cable is placed under tension at once without requiring that the machine as a whole be of excessive length, the device may be operated at a relatively high speed and thus render the prestressing of the cable a relatively quick and easy operation.

Briefly speaking, my novel method of prestressing cable is effected by means of a pay off or retarding device placed at the supply end of the cable which is to be operated upon and a take up device at the other end of the length of cable which is to be subjected to the prestressing force. The pay off and take up devices are so arranged that the length of the cable between the supply and take up reels and these devices will be under little or no stress whatever, so that it may be properly reeled and unreeled, while the cable, as it leaves the pay off device and as it is received upon the take up device, is under full stress. Moreover, the pay off and take up devices are positively driven and, due to the stretch of the cable or other causes, the length of the cable between these devices might vary to some extent under the load applied thereto. Means are provided for automatically varying the relative speeds of these devices. In the embodiment of my invention illustrated, the take up device is operated at a constant speed, while the speed of the pay off device is varied according to the elongation of the cable between the two ends thereof so that the length of cable under stress will be maintained substantially constant. As the stress is applied in the form of suspended weights, although it will be understood that the invention is not limited in this particular, if the cable were permitted to elongate, due to its stretch, the weights would continuously drop and would finally reach a position where they were no longer active. Therefore, as shown, the speed of the pay off device is controlled according to the drop or rise of the tensioning means so that the latter will be maintained at a constant height. I also contemplate the provision of a brake which will be automatically operated to stop the machine upon breakage of the cable or upon the sudden descent of the tensioning means from any cause.

One object of the invention is to provide a novel method for prestressing cable.

A further object of the invention is to provide a novel method for prestressing cable during the continuous travel of the cable, whereby a cable may be payed off of one reel, wound up upon another reel, and prestressed during this operation.

A still further object of the invention is to provide a new and improved machine for prestressing cable.

A still further object of the invention is to provide a device for unreeling a cable from one spool, reeling it upon another spool, and prestressing the cable during its travel between said spools.

A still further object of the invention is to provide a machine for prestressing cable comprising a pay off device and a take up device, so constructed that tensioning force may be applied to the cable and between said devices to prestress the cable during its continuous travel between said devices.

Still another object of the invention is to provide a prestressing machine as described above wherein the speed of the pay off and take up devices may be varied relatively one to the other according to the increase or decrease in length of the cable between said devices.

To these and other ends the invention relates to the novel features and combinations of parts to be hereinafter described and claimed.

In the accompanying drawings:

Fig. 1 is a top plan view of a prestressing machine embodying my invention;

Fig. 2 is a side elevational view of the same;

Figure 5:
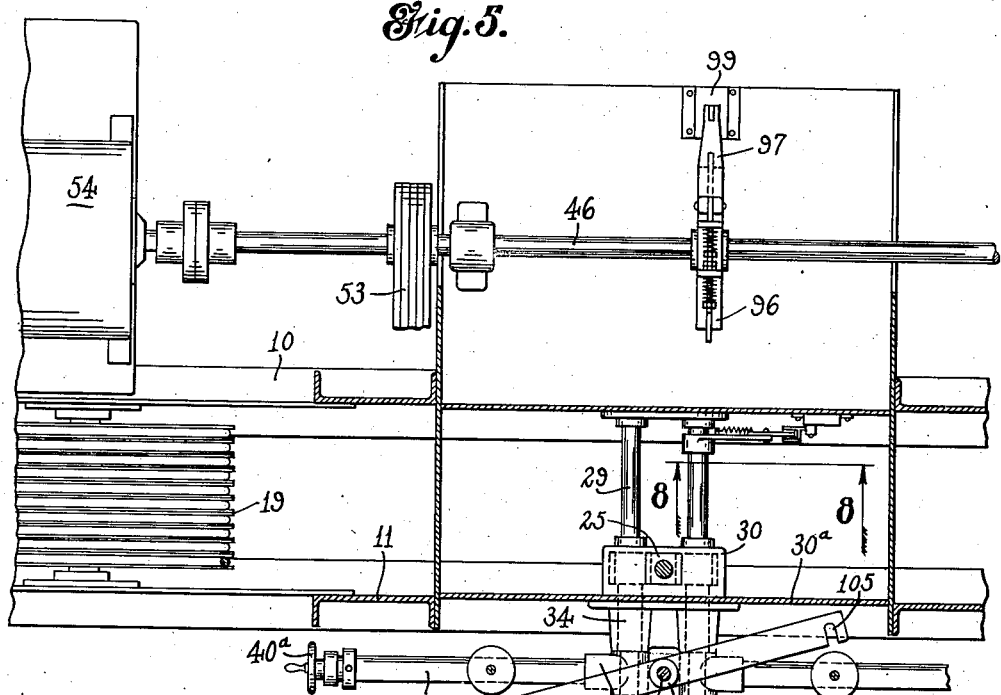
Figure 9:
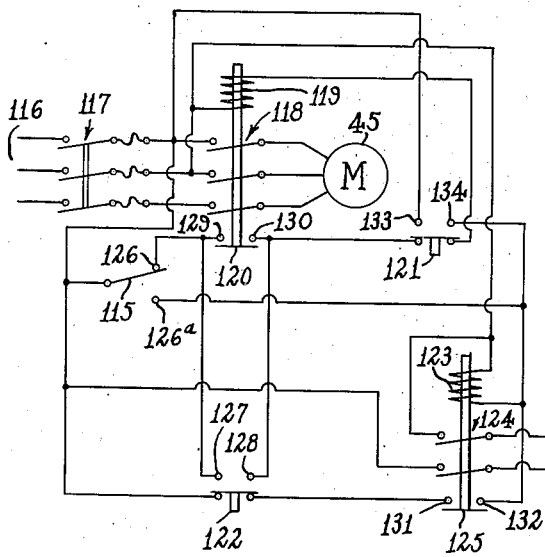
Figure 7:
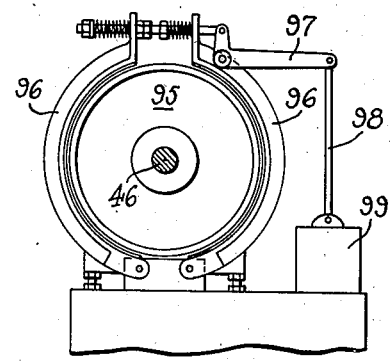

Figs. 3 and 4, taken together, constitute a side elevational view of the mechanism at the right-hand end of the machine;

Fig. 5 is a sectional view substantially on line 5—5 of Fig. 3;

Fig. 6 is a sectional view on line 6—6 of Fig. 4;

Fig. 7 is a side elevational view of the brake mechanism for stopping the machine;

Fig. 8 is an enlarged view of the switch mechanism for stopping the machine in the event of breakage of the cable; and Fig. 9 shows the electrical wiring diagram.

To illustrate a preferred embodiment of my novel prestressing machine for carrying out my method of prestressing cable, I have shown in the drawings a base frame designated generally by the numeral 10 from which rise standards 11 connected at their upper ends by cross members 12. Upon the frame of the machine are mounted a paying off device 13 and a take up device 14.

These devices are substantially alike and each consists of a pair of drums 15 and 16 having a plurality of V-shaped angular grooves or channels therein so that the cable may be trained over these drums, passing from one to the other lying within the grooves. As will be understood by those skilled in the art, such a device will frictionally hold the cable against slippage so that it may be delivered to the first groove in the drum 15, for example, of the paying off device under substantially no tension and taken from the last groove of the drum 16 under full tension. In the same manner, the cable may be drawn into the first groove of the drum 15 of the take up device under full tension and delivered from the last groove of the roll 16 under substantially no tension, the tension being absorbed by the friction of the cable in the grooves 17 of the drums, the movement of which, and consequently the movement of laps of the cable about the drums, may be varied to suit conditions.

Adjacent the drum 16 of the pay off device are mounted a plurality of sheaves 18, and spaced therefrom is a second set of sheaves 19, so that the cable after issuing from the drum 16 of the pay off device may pass to one of the sheaves 19, be trained about it, then pass rearwardly to be trained about one of the sheaves 18 and pass back to one of the sheaves 19 until it has been trained about all of these sheaves. The sheaves 18 and 19 are mounted to rotate freely so that the cable will run freely thereover, the purpose of these sheaves being to increase the length of the cable which may be placed under tension at one time, and increase the period of time under which any part of the cable is subject to the tensioning force during its passage through the machine. Any number of pulleys 18 and 19 may be provided. For example, I have found that it is convenient to provide nine of the pulleys 18 and ten of the pulleys 19, and by placing these pulleys 50 feet apart, arrangement is made for placing substantially a thousand feet of a cable under tension at one time.

Rotatably supported upon the standards 11 are pulleys or sheaves 20 and 22, between which is disposed a floating pulley 21 so that the cable may be passed over the two pulleys or sheaves 20 and 22 upon leaving sheaves 19 and pass below the sheave 21 so that the latter will be supported by the cable. The sheaves 20 and 22 are in elevated position with respect to the sheaves 18 and 19 so that the pulley 21 will be supported considerably above the bed of the machine. It will be apparent that if a weight or tensioning force is applied to the pulley 21, this will be borne by the cable and will place the cable under tension as will be later described.

From the pulley 22, the cable is led to the drum 15 of the take up device, and after traversing this device is taken off of the last groove of the drums 16 to be reeled up upon a spool in the usual manner.

As shown more especially in Figs. 3 and 5, a rack bar 25 is suspended from the pulley 21 by means of the yoke 26, the rack bar being provided with rack teeth 27 upon each side designed to be engaged by the teeth of pinions 28 secured upon shafts 29, the shafts in turn being rotatably mounted in a guide frame 30 serving to guide the rack 25 in a vertical path. The guide frame 30 may be mounted on a vertically disposed plate 30$^a$ extending between the standards 11.

Secured to the lower end of the rack bar is a rod 31 having a piston 32 thereon operating in a cylinder 33, the piston and cylinder comprising a dashpot to cushion the descent of the rack bar and pulley 21 in case of breakage of the cable.

The shafts 29 extend outwardly beyond the plate 30$^a$ through bearing members 34 and upon their extended ends are secured collars 35, which collars are in turn secured to the inner end of sleeves 36 projecting outwardly from the shafts 29 in substantially horizontal directions. Slidably mounted within each of the sleeves 36 is a nut 37 having pins 38 projecting outwardly from the sleeves through elongated slots 39. The nuts 37 may be moved longitudinally of the sleeves by means of screws 40 rotatably mounted in the sleeves and operated by the crank wheels 40$^a$. Secured to the pins 38 of each of the nuts 37 is a cable 42 which passes upwardly over a pulley 41 supported at the upper end of standards 11 and has suspended at its free end a weight 43.

With the above arrangement it will be apparent that the weights 43 exert an upward pull upon the outer ends of the sleeves 36, which in turn serves to apply a rotating force to the pinions 28 to rotate the latter in a direction to move the rack bar 25 downwardly which will in turn exert a downward pull upon the pulley 21 to apply a tensioning force to the cable trained around and below this pulley. It will also be apparent that by means of the screw 40 and nut 37, the latter may be moved inwardly or outwardly with respect to the sleeve 36, the pins 38 traveling in the slots 39 so that the leverage of the force exerted by the weights 43 may be varied. The sleeve 36 and pinion 28 acts as a lever of the first class, the power being applied through a lever arm equal to the distance of the center of the shaft 29 to the point of attachment of the cable 42 to the sleeve while the lever arm at the other side of the sleeve is constituted by the distance between the center of the shaft 29 and the point of engagement of the teeth of the pinion 28 with the rack bar 25.

The effect is that of a weight suspended by the pulleys 21, but the actual value of the weights 43 will be multiplied by the leverage exerted and also may be adjusted by means of the adjustable nuts 37. It will, of course, be understood that the weights 43 may be varied according to the amount of stress designed to be applied to the cable.

The paying off and take up devices are driven from a motor 45, the motor driving a shaft 46, one end of which extends into a gear box 47 from which extends a shaft 48 connected by a coupling 49 to the shaft 50 of the drum 15 of the take up device 14 (Fig. 1). From this shaft a sprocket chain 51 extends to the shaft 52 of the drum 16 so that both drums will be positively driven. The drums 15 and 16 will ordinarily be driven at a constant speed during any prestressing operation. However, as it may be desired to vary this speed according to the character of work being performed, it is preferable to use a varible speed motor so that the speed of the take up device may be adjusted to suit conditions.

The shaft 46 is connected with the motor shaft 45 by a suitable drive 53 and extends in both directions from this drive so that it is also employed to drive the paying off device 13. As shown, this shaft extends into a variable speed control mechanism designated generally by the numeral 54 and described more fully hereinafter, from which mechanism extends a shaft 55 connected by a sprocket drive 56 to a shaft 57 leading into a gear box 58 from which extends a shaft 59 connected to the shaft 60 of the drum 16 of the paying off device, the shaft 60 being connected by a sprocket drive 61 to the shaft 62 of the drum 15.

It is desirable to provide means for varying the relative speed of the paying off and take up devices, and as shown, the take up device is, as stated, driven at a constant speed while the speed of the pay off drums 15 and 16 may be varied by means of the variable speed control 54. The speed of these drums is automatically controlled according to the elongation of the cable between the paying off and take up devices by the mechanism shown more especially in Fig. 3, which will now be described.

A rock shaft 65 is rockably mounted upon the standards 11, and rigidly secured to this shaft is an arm 66 extending to the pulley 21 and provided with a slot 67 to receive a pin 68 secured at the center of the pulley. Also rigidly secured to the shaft 65 is a crank arm 69 which extends upwardly along the standards 11, and connected to its upper end is one end of a link 70, the other end of which is connected to a lever arm 71 rigidly secured to a shaft 72, rockably mounted upon the casing 73 of the variable speed mechanism 54. Also rigidly secured to the shaft 72 are crank arms 74 and 75 to which are pivoted links 76 and 77, respectively, the links being pivoted at their other ends to levers 78 and 79, pivoted at 80 and 81 intermediate their lengths so that the lower ends of these levers will move in a direction opposite to that of the upper ends. It will be also understood that the upper ends of these levers will move in opposite directions when the shaft 72 is oscillated owing to the fact that the crank arms 74 and 75 will be moved in opposite directions.

The shaft 46 extends into the casing 73 and drives a pulley 83, this pulley in turn driving a pulley 84 through a belt 85. It will be understood that the flanges 86 of these pulleys are movable axially so that the effective diameter of each of the pulleys will be varied as the flanges are moved outwardly and inwardly. The flanges 86 on one side of the pulleys 83 and 84 are connected to the lever 78 while those at the other side of the pulleys are connected to the lever 79. It will be seen, therefore, that as these levers are swung about their pivots, the flanges of one of the pulleys will be moved inwardly toward each other to increase the effective diameter of that pulley, while those of the other pulley will be moved outwardly to decrease its effective diameter. Therefore, movement of the levers 78 and 79 by the arm 71 will serve to increase the side of one pulley, decrease the sides of the other pulley, and thereby vary the speed of the drive transmitted to the pulleys.

The upper pulley 84 is secured upon the shaft 55 so that by means of this arrangement, the speed of the drums of the paying off device 13 may be varied while the speed of the shaft driven from the motor is constant. Moreover, this variation in speed is brought about by the movement of the pulley 21 as permitted by the elongation or stretch of the cable between the paying off and take up devices. If, for example, due to elongation of the cable, the pulley 21 moves downwardly, the arm 66 will be rocked downwardly, thus swinging the upper end of the arm 69 toward the right as shown in Fig. 3 and moving the arm 71 toward the right, which in turn will move the upper ends of the levers 78 and 79 inwardly, thus increasing the effective diameter of pulley 84 and slowing down the drums of the paying off device 13. As the take up drums will be rotated at a constant speed, this will tend to shorten the cable between the pay off and take up devices which will in turn cause the pulley 21 to move upwardly. Movement of the pulley 21 upwardly will, of course, have a reverse action upon the variable speed drive and tend to lengthen the cable so that the length of cable between the paying off and take up devices will be kept substantially constant.

The cable may be supplied from any suitable supply reel (not shown) and from such reel may be led over an idler 89 (Fig. 2), the cable being designated at 90. From this idler it then passes to the first of the grooves 17 in the drum 15 of the paying off device and thence through the machine as described. After leaving the take up device, the end 91 of the cable may be reeled up by any suitable reeling means not shown.

As shown in Fig. 3, provision may be made for adjustably connecting the link 70 to the arm 69 and 71 by means of a plurality of openings 92 and 93 provided in these arms. Also the link 70 may be made in two parts and a spring 94 interposed between these parts so that while the parts of the link will normally act as one, as if, from some emergency such as breaking the cable, the pulley 21 suddenly and rapidly descends, the spring 94 will permit extension of the link 70 to prevent an excessive strain upon the variable speed control mechanism.

In Figs. 5 and 7 of the drawings, I have shown a brake mechanism applied to the shaft 46 for stopping the rotation of this shaft when the motor 45 is cut off and it is desired to cut off the machine. This mechanism comprises a drum 95 secured to the shaft 46, with which drum cooperate the pivoted brake bands 96 in the usual manner, which bands are tightened about the drum by means of a lever 97 to which is secured a link 98 operated by a solenoid 99. The means for energizing the solenoid will be described hereinafter.

Also there is shown more particularly in Figs. 3 and 5 of the drawings a device for relieving the tension applied to the pulley 21. This will be necessary, for example, when the cable is initially threaded through the machine at the start of a new operation. For this purpose a shaft 100 is rotatably mounted at the front of the machine and provided with a crank wheel 101 by which it may be manually rotated. This shaft is threaded as shown at 102, and in engagement with the threads is a threaded collar 103 upon which are supported outwardly extending arms 104 provided at their ends with recesses 105 adapted to receive the cables 42 so that the arms 104 may engage below abutments 106 on these cables. When the arms are in position shown in Fig. 3, the crank 101 may be turned in a direction to raise the arms 104 which will lift the weights 43, and thus remove any tension from the members 36 and sheave 21. When it is desired to place the tension upon the cable after the latter has been properly threaded through the machine, the arms 104 are lowered by the reverse rotation of the shaft 100 so that the weights 43 will again be supported by the cable 42. The arms 104 may then be swung to an inoperative position shown in Fig. 5 so that they will not interfere with normal movement of the cables 42 and weights 43.

In Fig. 8 of the drawings, I have shown automatic means for opening the motor switch and applying the brake to the shaft 46 upon sudden descent of the weights 43 as might occur if the cable breaks, for example. Secured upon shaft 29 (Fig. 8) is an arm 110 carrying a yoke 111. This yoke is pivoted to the arm at 112 and held in a neutral position by the spring 113. The ends of the yoke 111 cooperate upon movement of the arm 110 to move a switch lever 114 to throw a contact member 115 shown diagrammatically in Fig. 9.

Current is supplied to the motor 45 from line wires 116 through what may be termed a hand disconnect switch 117 and a magnetically operated switch 118 positioned in series in the line. It will be understood that the hand operated switch is normally closed. The automatically operated switch is controlled by a solenoid 119 through an interlock switch 120 which is connected in series with a stop switch 121 and in shunt with a starting switch 122.

The solenoid 99 which operates the brake is controlled by a magnetic coil 123 which controls the switch 124 leading to the solenoid, and the coil 123 also controls a second interlock 125 which holds the brake in operative position until it is released.

With the parts in the position shown in Fig. 9, the main switch 117 will normally be closed when it is desired to start the machine, and the switch arm 115 will be in the position shown in this figure, making contact with a terminal 126. If the push button starting switch 122 is now operated, it will close the circuit between the terminals 127 and 128, and thus pass a current through the coil 119 to raise the interlock switch 120 and connect terminals 129 and 130. The coil 119 also when energized operates to close the switch 118 to the motor.

Also, if the brake is set when the starting button 122 is pressed, the circuit through the contacts 131 and 132 will be opened, so that the interlock 125 will drop and open the switch 124 to release the brake. The machine is now placed in operation, the starting button 122 having returned to its normal position or that shown in Fig. 9.

If it is desired to stop the machine at any time, the button 121 may be pressed to make contact between the terminals 133 and 134. As will be seen, this will open the circuit through the coil 119 and cause movement of the switch 118 to cut off the motor. At the same time the circuit will be closed through the coil 123 and effect the application of the brake.

If the weights 42 descend to an unusual extent so that the shaft 29 turns through a sufficient angle to cause one of the ends of the yoke 111 to operate the switch arm 114, this will cause the member 115 to swing away from contact member 126 and engage contact member 126a. This, it will be apparent, will open the circuit through the coil 119 and close the circuit through coil 123 so that the motor will be cut off and the brake applied just as is done when the stop switch 121 is operated. Thus the machine, when in operation, may be stopped at any time desired by the operator by means of the stop switch 121 and may also be stopped automatically by movement of the switch lever 114 in case of breakage of the cable.

While I have shown and described a preferred embodiment of my invention, it will be understood that it is not to be limited to all of the details shown, but is capable of modification and variation within the spirit of the invention and within the scope of the claims.

What I claim is:

1. A device of prestressing cable during the continuous movement thereof, comprising a paying-off device, a take-up device, means for positively driving said devices, means located between said devices for placing the cable under tension, said means comprising a pulley supported by a loop of the cable, a lever pivoted between its ends and connected at one end to said pulley, a weight applied to said lever adjacent the other end thereof, and means to control the speed at which one of said devices is driven by the rise and fall of said pulley, the connections of said pulley with said lever comprising a rack secured to the pulley and a pinion fixed to the lever and engaged with the teeth of said rack.

2. A device for prestressing cable during the continuous movement thereof, comprising a paying-off device, a take-up device, means for positively driving said devices, means located between said devices for placing the cable under tension, said means comprising a pulley supported by a loop of the cable, a lever pivoted between its ends and connected at one end to said pulley, a weight applied to said lever adjacent the other end thereof, the connections of said pulley with said lever comprising a rack secured to the pulley and a pinion fixed to the lever and engaged with the teeth of said rack, a variable speed transmission unit through which the paying-off device is driven, and means for controlling said unit to vary the speed of the paying-off means according to the rise and fall of the pulley.

3. A device for prestressing cable during the continuous movement thereof, comprising paying-off means, take-up means, a single source of power for driving both said means, separate driving connections between said source of power and the paying-off means and the take-up means respectively, a weighted member supported by a loop of the cable between said means for applying tension to the cable, a variable speed transmission unit in one of said driving connections, and means controlling said unit to vary the speed of said one means according to the rise and fall of said weighted member.

4. A device for prestressing cable during the continuous movement thereof, comprising paying-off means, take-up means, a single source of power for driving both said means, separate driving connections between said source of power and the paying-off means and the take-up means respectively, a weighted member supported by a loop of the cable between said means for applying tension to the cable, a variable speed transmission unit in the driving connection to said paying-off means, and means controlling said unit to vary the speed of the paying-off means according to the rise and fall of the weighted member.

VICTOR T. SWANSON.